A. C. BOOTH.
TOOTH BRUSH.
APPLICATION FILED APR. 3, 1916.
Reissued Feb. 11, 1919. 14,589.
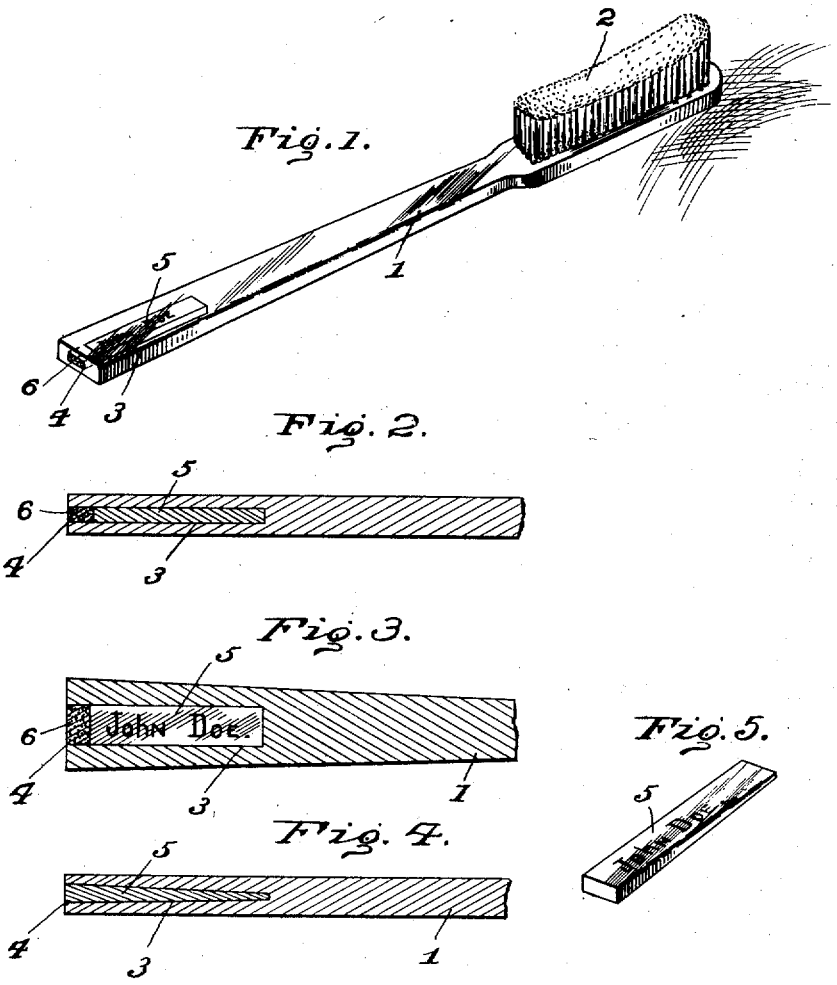
Inventor:
Alba C. Booth
By Frank C. Curtis,
Attorney

UNITED STATES PATENT OFFICE.

ALBA C. BOOTH, OF BURLINGTON, VERMONT, ASSIGNOR TO UNIVERSAL BRUSH COMPANY, OF TROY, NEW YORK, A CORPORATION OF NEW YORK.

TOOTH-BRUSH.

14,589. Specification of Reissued Letters Patent. Reissued Feb. 11, 1919.

Original No. 1,155,878, dated October 5, 1915, Serial No. 764,712, filed April 30, 1913. Application for reissue filed April 3, 1916. Serial No. 88,721.

*To all whom it may concern:*

Be it known that I, ALBA C. BOOTH, a citizen of the United States, residing at Burlington, in the county of Chittenden and State of Vermont, have invented certain new and useful Improvements in Tooth-Brushes, of which the following is a specification.

Reference may be had to the accompanying drawings, and the reference characters marked thereon, which form a part of this specification. Similar characters refer to similar parts in the several figures therein.

My invention relates to improvements in tooth-brushes, the primary object being to provide simple, cheap, and practicable means for applying a name or other signifying sign to a tooth-brush of the transparent-handle type in order that the purchaser of the brush may always be able to easily distinguish his brush from any other.

Another object of my invention is to provide such means for securing the name or label to a tooth-brush so that it is not influenced by any amount of handling, water, or, in fact, any usual use to which it may be put.

A further object of my invention is to so construct the name-displaying means that a merchant may have tooth-brushes in stock, and upon the sale of a tooth-brush to a purchaser may quickly and easily apply the purchaser's name to the handle in a way in which as previously pointed out, it cannot be removed or injuriously affected by any amount of subsequent handling.

A further object of my invention is to render visible from opposite sides of the handle of the brush, the name or signifying sign by displaying-means which can be quickly and easily applied and which cannot be removed by any ordinary handling of the brush, and which cannot be injuriously affected by water in any usual use to which the brush may be put.

In the accompanying drawings, Figure 1 is a perspective view of a tooth-brush of the transparent-handle type having my improved label-attaching means applied thereto.

Fig. 2 is a cross sectional view of Fig. 1, showing a portion of the handle.

Fig. 3 is an enlarged detail top plan view of Fig. 1, showing a portion of the handle.

Fig. 4 is a modification of my device showing a portion of the handle, and the label and plug formed in one piece.

Fig. 5 is a detailed perspective view of a combined label and plug.

Referring now to the drawings wherein the invention is shown in preferred form, 1 indicates a transparent handle of a tooth-brush which carries on its upper surface, brush-bristles, 2.

At the other end of the handle, 1, I provide an elongated longitudinal recess, 3, having its entrance, 4, in the end of the handle, 1, preferably.

The said opening, 3, is of a width less than the width of the handle, 1, of a thickness less than the thickness of the handle, 1, and of a length adapted to receive a label, 5, of sufficient length to carry a name containing the usual number of letters.

Within the opening, 3, I provide a label carrying the purchaser's name or any signifying sign he may desire printed on both sides or either side of the label so that it may be read from either side of the handle.

In order to close the opening, 3, I provide a plug, 6, of plastic material in order that it may be forced within the opening in the end of the handle, 1, with considerable force in order to insure its retention therein and yet without subjecting the handle of the brush to sufficient pressure to break it, whereby the opening, 3, is rendered water tight.

As will readily be understood my means of attaching a label can readily be applied to any tooth-brush of the transparent type whether made especially adapted to receive my improved label or not.

In Fig. 3, the label, 5, is wedge-shaped having its thicker end of a size to fit the opening, 4, in the end of the handle thus obviating the necessity of the plug, 6.

In either construction shown, the label makes close contact on opposite sides with transparent material extending from the respective sides of the label to the surface of the handle, the label being surrounded by transparent material with which it is complementary to make up the full cross-section of that part of the handle wherein the label is located.

As the writing or printing on the opposite sides of the label is thus in contact with transparent material, and nothing but transparent material intervenes between the writing and the surface of the handle, the writing will be clearly visible from opposite sides of the handle; and as the writing surfaces on the label are in close contact with the transparent material, they cannot warp so as to interfere with the contact of the writing with the transparent material, and thus cause distortion of the written characters when viewed through the transparent material.

What I claim as new and desire to secure by Letters Patent is—

1. A brush comprising a brush-head and a transparent handle, the said handle having an elongated longitudinal aperture therewithin, a label within the said aperture and closely fitting the walls thereof, and completely filling the same, and a plastic plug snugly fitting within the aperture and adapted to hold the label-layer, and to close and seal the open end of the aperture.

2. A brush comprising a brush-head and a transparent handle, the said handle having an elongated longitudinal aperture extending from the end thereof, a label marked on both sides within the said aperture, and snugly fitting the walls thereof, and completely filling the aperture, and a plastic plug fitting within the open end of the aperture, and adapted to hold the label therewithin, and to close and seal the end of the aperture.

3. A brush comprising a brush-head and a transparent handle, the said handle having a longitudinal wedge-shaped aperture therewithin extending from the end of the handle, and a wedge-shaped label fitting within the aperture, and of a size to snugly fit and engage the walls of said longitudinal aperture for the purpose described.

4. A brush comprising a brush-head and a transparent handle, the said handle having an elongated longitudinal aperture therewithin, and a label within said aperture, and of a size to closely fit the walls thereof, and completely filling the same substantially as shown and described.

5. A brush having a handle, provided with a longitudinal aperture and inclosed within the aperture a label with writing-surfaces on its opposite sides, the part of said handle wherein the label is located being formed of transparent material surrounding the label in close contact therewith and extending from the surface of the handle on opposite sides to the respective writing-surfaces on the label.

6. A brush having a handle provided with a longitudinal aperture, and incorporated therein a label with writing-surfaces on its opposite sides, said label being surrounded by, and in close contact with, transparent material with which it is complementary to make up the full cross-section of that part of the handle wherein the label is located.

7. A brush having a handle provided with an elongated longitudinal aperture therewithin, and a label and a plug inserted within said aperture closely fitting the walls thereof, completely filling the same, and the plug closing and sealing the open end of the aperture, with transparent material only between the opposite sides of the handle and the respective opposite sides of the label.

8. A brush having a transparent handle provided with a longitudinal aperture, and a label and a plug inserted therewithin with the plug closing the opening thereof, and the label visible from the opposite sides of the handle through transparent material in close contact with the label.

9. A brush having a handle comprising a body of transparent material provided with an elongated aperture and a plug inserted in, and sealing the entrance to, said aperture, and a label having writing surfaces on its opposite sides wholly inclosed by said plug and the body of the handle in close contact therewith, and with transparent material only between the opposite sides of the label and the outer surfaces of the handle.

ALBA C. BOOTH.